(12) United States Patent
Zhang et al.

(10) Patent No.: US 11,773,025 B2
(45) Date of Patent: Oct. 3, 2023

(54) RED MUD-BASED COMPOSITE CALCIUM FERRITE AND PREPARATION METHOD AND USE THEREOF

(71) Applicant: University of Science and Technology Beijing, Beijing (CN)

(72) Inventors: Yanling Zhang, Beijing (CN); Zheng Zhao, Beijing (CN); Weifeng Zhang, Beijing (CN); Kan Yu, Beijing (CN); Yao Zhang, Beijing (CN)

(73) Assignee: University of Science and Technology Beijing, Beijing (CN)

( * ) Notice: Subject to any disclaimer, the term of this patent is extended or adjusted under 35 U.S.C. 154(b) by 36 days.

(21) Appl. No.: 17/964,973

(22) Filed: Oct. 13, 2022

(65) Prior Publication Data

US 2023/0117352 A1 Apr. 20, 2023

(30) Foreign Application Priority Data

Oct. 19, 2021 (CN) .......................... 202111215491.8

(51) Int. Cl.
*C04B 35/26* (2006.01)

(52) U.S. Cl.
CPC ........ *C04B 35/2633* (2013.01); *C04B 35/2683* (2013.01); *C04B 2235/3208* (2013.01); *C04B 2235/3274* (2013.01); *C04B 2235/6583* (2013.01)

(58) Field of Classification Search
CPC ......... C04B 35/2683; C04B 2235/3274; C04B 2235/3208; C04B 2235/6583
See application file for complete search history.

(56) References Cited

FOREIGN PATENT DOCUMENTS

| CN | 102787212 A | * | 11/2012 |
| CN | 103725825 A | * | 4/2014 |

OTHER PUBLICATIONS

Yaniing Zhang, et al, "Application of Bayer Red Mud-Based Flux in the Steelmaking Process", Steel Research International, 87 ( 2016) No. 9999. 2016 Wiley-VCH Vertag GmbH & Co KGaA, Weinheim www.steel-research.de, Jul. 04, 2016.*
Yanling Zhang, et al "Application of Bayer Red Mud-Based Flux in the Steelmaking Process" Steel Research International, 87 (2016) No. 9999, 2016 Wiley-VCH Verlag GmbH & Co. KGaA, Weinheim www.steel-research.de.

* cited by examiner

*Primary Examiner* — C Melissa Koslow
(74) *Attorney, Agent, or Firm* — Jacob M. Ward; Ward Law Office LLC

(57) ABSTRACT

Provided is a red mud-based composite calcium ferrite and a preparation method and use thereof. The preparation method of the red mud-based composite calcium ferrite includes the following steps: mixing red mud and a calcium source, and roasting an obtained mixture in an oxygen-containing atmosphere to obtain the red mud-based composite calcium ferrite; where the calcium source is selected from the group consisting of lime and calcium carbonate. In the present disclosure, the composite calcium ferrite is prepared using a solid waste red mud, with a greatly reduced cost of raw materials; on the other hand, compared with traditional calcium ferrite, the composite calcium ferrite mainly has phase structures of $CaFe_2O_4$, $Ca_2FeAlO_5$, and $Ca_2Fe_2O_5$. Therefore, the composite calcium ferrite has a lower melting point, a higher lime dissolution efficiency, and better fluxing and dephosphorization effects during primary smelting and refining of molten steel, and has broad prospects for use in industry.

5 Claims, 2 Drawing Sheets

RED MUD-BASED COMPOSITE CALCIUM FERRITE AND PREPARATION METHOD AND USE THEREOF

CROSS REFERENCE TO RELATED APPLICATION

This patent application claims the benefit and priority of Chinese Patent Application No. 202111215491.8, filed on Oct. 19, 2021, the disclosure of which is incorporated by reference herein in its entirety as part of the present application.

FIELD OF THE INVENTION

The present disclosure relates to the technical field of metallurgy, in particular to red mud-based composite calcium ferrite and a preparation method and use thereof.

BACKGROUND OF THE INVENTION

Calcium ferrite is a well-known and excellent flux and dephosphorization agent in steel making. Calcium ferrite has a low melting point and a high lime dissolution efficiency, providing excellent thermodynamic and kinetic conditions for dephosphorization of the steel making.

At present, calcium ferrite on the market is generally prepared from an iron concentrate powder and lime that are expensive, resulting in a high cost of the steel making.

SUMMARY OF THE INVENTION

An objective of the present disclosure is to provide red mud-based composite calcium ferrite and a preparation method and use thereof. The red mud-based composite calcium ferrite has a low cost and better fluxing and dephosphorization effects during steel making.

To achieve the above objective, the present disclosure provides the following technical solutions.

The present disclosure provides a preparation method of red mud-based composite calcium ferrite, including the following steps:

mixing red mud and a calcium source, and roasting an obtained mixture in an oxygen-containing atmosphere to obtain the red mud-based composite calcium ferrite; where the calcium source is selected from the group consisting of lime and calcium carbonate.

Preferably, an amount of the red mud may be in a molar content of $Fe_2O_3$, and an amount of the calcium source may be in a molar content of CaO; and the $Fe_2O_3$ and the CaO may have a molar ratio of 1:(0.8-1).

Preferably, the roasting may be conducted at 1,000° C. to 1,200° C. for 0.5 h to 2 h.

Preferably, the preparation method may further include pressing the mixture into a mass before the roasting.

Preferably, the red mud may have greater than 40 wt% of the $Fe_2O_3$ and 10 wt% to 15 wt% of the $Al_2O_3$.

Preferably, the lime may have greater than 80 wt% of available calcium oxide, and the calcium carbonate may have greater than 50 wt% of the available calcium oxide, wherein the available calcium oxide refers to the amount of calcium oxide resulting from calculating the content of calcium in the lime and calcium carbonate in terms of calcium oxide.

Preferably, the oxygen-containing atmosphere may include an air atmosphere or an oxygen atmosphere.

The present disclosure further provides red mud-based composite calcium ferrite prepared by the preparation method, including $CaFe_2O_4$, $Ca_2FeAlO_5$, and $Ca_2Fe_2O_5$.

Preferably, the red mud-based composite calcium ferrite may include 5% to 15% of the $CaFe_2O_4$, 5% to 15% of the $Ca_2FeAlO_5$, and 70% to 90% of the $Ca_2Fe_2O_5$ by mass percent.

The present disclosure further provides use of the red mud-based composite calcium ferrite in steel making.

The present disclosure provides a preparation method of red mud-based composite calcium ferrite, including the following steps: mixing red mud and a calcium source, and roasting an obtained mixture in an oxygen-containing atmosphere to obtain the red mud-based composite calcium ferrite; where the calcium source is selected from the group consisting of lime and calcium carbonate. In the present disclosure, the composite calcium ferrite is prepared using a solid waste red mud, with a greatly reduced cost of raw materials; the red mud-based composite calcium ferrite has a melting point of 1,050° C. to 1,100° C., and phase structures of mainly $CaFe_2O_4$, $Ca_2FeAlO_5$, and $Ca_2Fe_2O_5$. Compared with ordinary calcium ferrite having a melting point of 1,150° C. to 1,250° C., the composite calcium ferrite has a lower melting point, a higher lime dissolution efficiency increased by about 25%, and better fluxing and dephosphorization effects during the steel making.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The above, as well as other advantages of the present disclosure, will become readily apparent to those skilled in the art from the following detailed description, particularly when considered in the light of the drawings described hereafter.

DETAILED DESCRIPTION OF THE INVENTION

Figure 1:
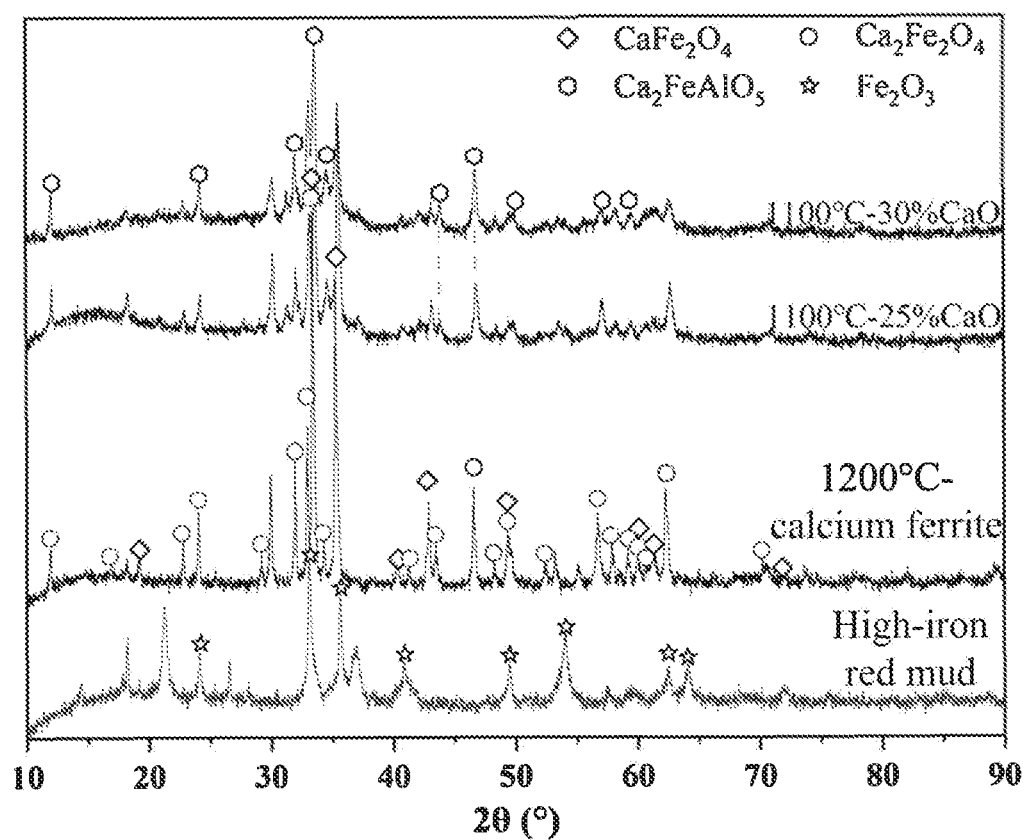
FIG. 1 shows an X-ray diffraction (XRD) pattern of a red mud raw material used in Example 1, composite calcium ferrite prepared in Examples 1 to 2, and calcium ferrite prepared in Comparative Example 1.

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical unless otherwise disclosed.

The present disclosure provides a preparation method of red mud-based composite calcium ferrite, including the following steps:

mixing red mud and a calcium source, and roasting an obtained mixture in an oxygen-containing atmosphere to obtain the red mud-based composite calcium ferrite; where the calcium source is selected from the group consisting of lime and calcium carbonate.

In the present disclosure, the red mud and the calcium source are mixed to obtain the mixture.

In the present disclosure, the red mud is preferably an industrial solid waste red mud produced by aluminum production; and the red mud has preferably greater than 40 wt% of the $Fe_2O_3$ and preferably 10 wt% to 15 wt% of the $Al_2O_3$. Further, the red mud includes preferably: $Fe_2O_3$: >40 wt%, $Al_2O_3$: 10 wt% to 15 wt%, $SiO_2$: 2 wt% to 5 wt%, $TiO_2$: 4 wt% to 5 wt%, and $Na_2O$: 1 wt% to 2 wt%. The red mud has a moisture content of preferably less than 8 wt%. The red mud has a particle size of preferably less than 200 mesh.

In the present disclosure, the calcium source is selected from the group consisting of lime and calcium carbonate; the lime has preferably greater than 80 wt% of available calcium oxide, and the calcium carbonate has preferably greater than 50 wt% of the available calcium oxide. The lime and the calcium carbonate each have a moisture content of preferably less than 1 wt%. The calcium source has a particle size of preferably less than 200 mesh.

In the present disclosure, controlling the moisture content of the red mud and the calcium source within the above range can prevent a mass ratio from being unbalanced and prevent adverse effects on the equipment.

In the present disclosure, an amount of the red mud is in a molar content of $Fe_2O_3$, and an amount of the calcium source is in a molar content of CaO; and the $Fe_2O_3$ and the CaO have a molar ratio of preferably 1:(0.8-1), more preferably 1:(0.85-0.95), and further more preferably 1:0.9. By controlling the molar ratio of the $Fe_2O_3$ to the CaO in the above range, it is further ensured that the main phases of the product are calcium ferrite ($CaFe_2O_4$ and $Ca_2Fe_2O_5$) and calcium aluminoferrite ($Ca_2FeAlO_5$).

In the present disclosure, there is no special requirement for a mixing method, and any method known in the art capable of uniformly mixing can be used. In an example, the mixing is conducted by a mixer for 2 min.

In the present disclosure, the mixture is preferably pressed into a mass, and then roasted in an oxygen-containing atmosphere to obtain the red mud-based composite calcium ferrite.

In the present disclosure, there is no special requirement for a method for pressing into the mass, and any method for pressing into the mass well known in the art can be used. There is no special requirement for a size and shape of the mass; in an example, specifically the mixture is pressed into a cylindrical block of D10 mm×H10 mm. The mixture of red mud and calcium source has a certain strength by pressing into the mass, which facilitates sintering, with tighter bonding and a better reactivity.

In the present disclosure, the roasting is conducted at preferably 1,000° C. to 1,200° C., more preferably 1,050° C. to 1,150° C., and further more preferably 1,100° C. for preferably 0.5 h to 2 h, more preferably 1.0 h to 1.5 h. The roasting temperature is obtained by heating at preferably 5° C./min. The oxygen-containing atmosphere is preferably an air atmosphere or an oxygen atmosphere.

In the present disclosure, during the roasting, the $Fe_2O_3$ and the $Al_2O_3$ in the red mud react with the CaO to form phases mainly including $CaFe_2O_4$, $Ca_2FeAlO_5$, and $Ca_2Fe_2O_5$.

In the present disclosure, there is no special requirement for roasting equipment, and any high-temperature heating equipment well known in the art can be used. In an example, the roasting is conducted preferably in a horizontal high-temperature resistance furnace.

In the present disclosure, after the roasting, an obtained solid phase is preferably cooled to obtain the red mud-based composite calcium ferrite.

In the present disclosure, the red mud-based composite calcium ferrite is prepared from the industrial solid waste red mud as a raw material. The red mud produced during production of alumina by a Bayer process has a high $Fe_2O_3$ content. These Bayer red mud materials can be directly used as raw materials to prepare the composite calcium ferrite after air-drying (a moisture content of less than 8%), with a production cost being much lower than that of general calcium ferrite products on the market.

The present disclosure further provides red mud-based composite calcium ferrite prepared by the preparation method, including $CaFe_2O_4$, $Ca_2FeAlO_5$, and $Ca_2Fe_2O_5$. The red mud-based composite calcium ferrite includes preferably 5% to 15% of the $CaFe_2O_4$, 5% to 15% of the $Ca_2FeAlO_5$, and 70% to 90% of the $Ca_2Fe_2O_5$ by mass percent. In an example, the composite calcium ferrite includes 12% of the $CaFe_2O_4$, 10% of the $Ca_2FeAlO_5$, and 72% of the $Ca_2Fe_2O_5$, or includes 15% of the $CaFe_2O_4$, 10% of the $Ca_2FeAlO_5$, and 70% of the $Ca_2Fe_2O_5$, and other reactants as a balance.

In the present disclosure, the red mud-based composite calcium ferrite includes the main phases of including $CaFe_2O_4$, $Ca_2FeAlO_5$, and $Ca_2Fe_2O_5$; compared with calcium ferrite, the composite calcium ferrite has a lower melting point and a higher lime dissolution efficiency. When being used as a flux and/or a dephosphorization agent in the steel making, the composite calcium ferrite can effectively shorten a smelting cycle and greatly improve a dephosphorization efficiency.

The present disclosure further provides use of the red mud-based composite calcium ferrite in steel making. The composite calcium ferrite is preferably used as a flux and/or a dephosphorization agent in the steel making. The steel making includes preferably primary smelting and/or refining. The present disclosure has no particular requirement on the implementation of the use, as long as the implementation of the use may be well known in the art.

The red mud-based composite calcium ferrite and the preparation method and the use thereof as provided by the present disclosure will be described in detail in connection with the following examples, but they should not be construed as limiting the claimed scope of the present disclosure.

Example 1 a. Bayer red mud of a domestic enterprise (including $Fe_2O_3$: 65 wt%, $Al_2O_3$: 12 wt%,- $SiO_2$: 3 wt%, $TiO_2$: 4 wt%, and $Na_2O$: 1.5 wt%) and a lime powder were finely ground, and sieved with a 200-mesh sieve to collect a material under the sieve; according to a molar ratio of $Fe_2O_3$ and CaO at 1:1, 100 g of the red mud and 30 g of the lime powder were mixed well with a mixer for 2 min, and pressed into a cylindrical block of D10 mm×H10 mm.

b. The block was placed into a horizontal high-temperature resistance furnace, heated to 1,100° C. at 5° C./min and held in an air atmosphere for 2 h; an obtained solid phase was cooled to obtain red mud-based composite calcium ferrite, denoted as 1,100° C.-30% CaO, including 12% of the $CaFe_2O_4$, 10% of the $Ca_2FeAlO_5$, and 72% of the $Ca_2Fe_2O_5$.

Example 2 a. Bayer red mud of a domestic enterprise (including: $Fe_2O_3$: 65 wt%, $Al_2O_3$: 12 wt%,-$SiO_2$: 3 wt%, $TiO_2$: 4 wt%, and $Na_2O$: 1.5 wt%) and a lime powder were finely ground, and sieved with a 200-mesh sieve to collect a material under the sieve; according to a molar ratio of $Fe_2O_3$ and CaO at 1:0.8, 100 g of the red mud and 25 g of the lime powder were mixed well with a mixer for 2 min, and directly put into a crucible without briquetting.

b. The crucible was placed into a horizontal high-temperature resistance furnace, heated to 1,100° C. at 5° C./min and held in an air atmosphere for 2 h; an obtained solid phase was cooled to obtain red mud-based composite calcium ferrite, denoted as 1,100° C.-25% CaO, including 15% of the $CaFe_2O_4$, 10% of the $Ca_2FeAlO_5$, and 70% of the $Ca_2Fe_2O_5$.

Comparative Example 1

Calcium ferrite was prepared from pure $Fe_2O_3$ and CaO, including the following steps:

74.1 g of a $Fe_2O_3$ powder and 25.9 g of a CaO powder were stirred for 2 min, thoroughly mixed, and pressed into a cylindrical block of D10 mm × H10 mm; the block was placed into a horizontal high-temperature resistance furnace, heated to 1,200° C. at 5° C./min and held in an air atmosphere for 2 h; an obtained solid phase was cooled to obtain calcium ferrite, denoted as 1,200° C.-calcium ferrite, including 25% of the $CaFe_2O_4$ and 75% of the $Ca_2Fe_2O_5$.

Structural Characterization

The red mud raw materials used in Example 1, the red mud-based composite calcium ferrite prepared in Examples 1 to 2, and the calcium ferrite prepared in Comparative Example 1 were characterized by XRD, and results were shown in FIG. 1. As can be seen from FIG. 1, comparing the raw materials and the pure calcium ferrite, in the product of the present disclosure prepared from the red mud and the lime by calcining: in addition to a similar phase of the calcium ferrite, there are also a $Ca_2FeAlO_5$ phase, and there is no unreacted $Fe_2O_3$.

Test Example 1

A dephosphorization test was conducted on pig iron blocks with initial [P] content of 0.20 wt% to 0.25 wt%, [C] content of 4.0 wt%, and [Si] content of 0.4 wt% at 1,410° C., where the pig iron blocks were divided into three groups added with $Fe_2O_3$ + CaO, $Fe_2O_3$ + CaO + pure calcium ferrite, and $Fe_2O_3$ + CaO + red mud-based composite calcium ferrite of Example 1. The total contents of initially-contained $Fe_2O_3$ and CaO contained in the three groups were controlled to be consistent. Specifically, the dephosphorization agent $Fe_2O_3$ + CaO accounted for 20% of an molten iron mass, where there were 85% of the $Fe_2O_3$, and 15% of the CaO; a total addition amount of the $Fe_2O_3$ + CaO + pure calcium ferrite accounted for 20% of the molten iron mass, where there were 67% of the $Fe_2O_3$, 8.4% of the CaO, and 24.6% of the pure calcium ferrite; an addition amount of the $Fe_2O_3$ + CaO + red mud-based composite calcium ferrite of Example 1 accounted for 20% of the molten iron mass, where there were 66.5% of the $Fe_2O_3$, 7.8% of the CaO, and 25.7% of the red mud-based composite calcium ferrite of Example 1; after taking molten iron samples at 0 min, 5 min, and 10 min of reaction, a [P] content of the molten iron was measured, and dephosphorization effects under three different conditions were compared. The results were shown in FIG. 2.

Figure 2:
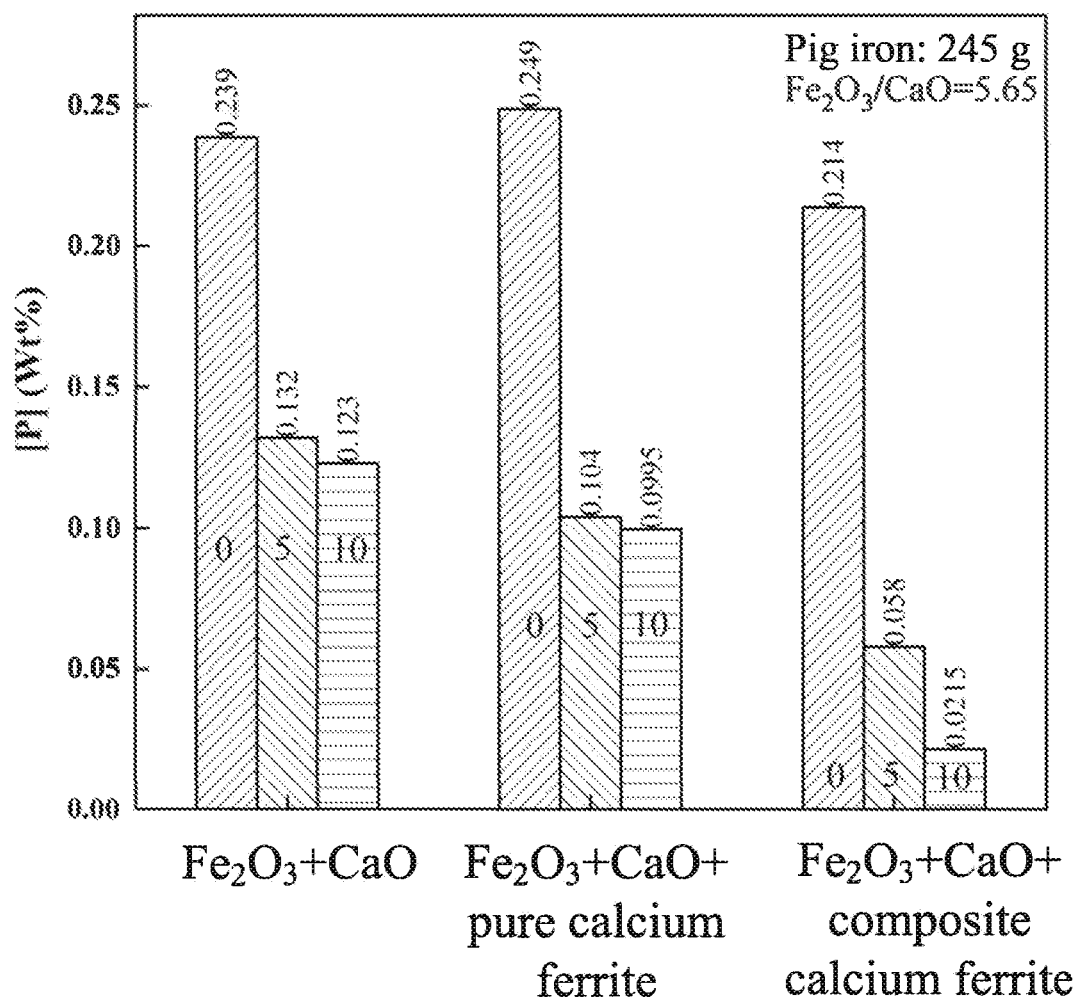
FIG. 2 shows results of a dephosphorization test in Test Example 1, where the dephosphorization effects are obtained by adding three dephosphorization agents $Fe_2O_3$ + CaO, $Fe_2O_3$ + CaO + pure calcium ferrite, and $Fe_2O_3$ + CaO + composite calcium ferrite, respectively.

It can be seen from FIG. 2 that under high phosphorus conditions, the first type $Fe_2O_3$ + CaO represents the most commonly-used method for dephosphorization in steel making, with an endpoint [P] content of 0.123 wt% within 10 min. The second type is added with part of the pure calcium ferrite, with an addition amount controlled at 25%, and an endpoint [P] content within 10 min is 0.0995 wt%, such that the dephosphorization effect is better than that of the first type. The third type is added with the composite calcium ferrite prepared in Example 1, and an endpoint [P] content within 10 min is 0.0215 wt%, such that the dephosphorization effect is better than that of the first two types. In summary, the red mud-based composite calcium ferrite of the present disclosure has a high dephosphorization efficiency and excellent effect.

Test Example 2

Based on the performance test of Test Example 1: a dephosphorization test was conducted on pig iron blocks with initial [P] content of 0.20 wt% to 0.25 wt%, [C] content of 4.0 wt%, and [Si] content of 0.4 wt% at 1,410° C., and $Fe_2O_3$ + CaO + red mud-based composite calcium ferrite of Example 2 was added. The addition amount of the dephosphorization agent accounted for 20% of a mass of the molten iron; there were 66.5% of the $Fe_2O_3$, 8.5% of the CaO, and 25% of the red mud-based composite calcium ferrite of Example 2; after reaction for 10 min, a molten iron sample was collected, and a [P] content of the molten iron was measured; the [P] content was 0.032 wt% to reach an acceptable level.

As can be seen from the above examples and comparative examples, the present disclosure provides a preparation method and use of the composite calcium ferrite. The composite calcium ferrite has a low cost and better fluxing and dephosphorization effects during steel making.

The above descriptions are merely preferred implementations of the present disclosure. It should be noted that a person of ordinary skill in the art may further make several improvements and modifications without departing from the principle of the present disclosure, but such improvements and modifications should be deemed as falling within the protection scope of the present disclosure.

What is claimed is:

1. A preparation method of red mud-based composite calcium ferrite, comprising the following steps:
   mixing red mud and a calcium source, and roasting an obtained mixture in an oxygen-containing atmosphere to obtain the red mud-based composite calcium ferrite;
   wherein the calcium source is selected from the group consisting of lime and calcium carbonate;
   an amount of the red mud is in a molar content of $Fe_2O_3$, and an amount of the calcium source is in a molar content of CaO; and the $Fe_2O_3$ and the CaO have a molar ratio of 1:(0.8-1);
   the roasting is conducted at 1,000° C. to 1,200° C. for 0.5 h to 2 h;
   the red mud has greater than 40 wt% of the $Fe_2O_3$ and 10 wt% to 15 wt% of the $Al_2O_3$;
   the red mud-based composite calcium ferrite comprises 5% to 15% of $CaFe_2O_4$, 5% to 15% of $Ca_2FeAlO_5$, and 70% to 90% of $Ca_2Fe_2O_5$ by mass percent, and has a melting point of 1,050° C. to 1,100° C.

2. The preparation method according to claim 1, further comprising pressing the mixture into a mass before the roasting.

3. The preparation method according to claim 1, wherein the lime has greater than 80 wt% of available calcium oxide, and the calcium carbonate has greater than 50 wt% of the available calcium oxide.

4. The preparation method according to claim 1, wherein the oxygen-containing atmosphere comprises an air atmosphere or an oxygen atmosphere.

5. Red mud-based composite calcium ferrite prepared by the preparation method according to claim 1, comprising $CaFe_2O_4$, $Ca_2FeAlO_5$, and $Ca_2Fe_2O_5$; wherein the red mud-based composite calcium ferrite comprises 5% to 15% of the $CaFe_2O_4$, 5% to 15% of the $Ca_2FeAlO_5$, and 70% to 90% of the $Ca_2Fe_2O_5$ by mass percent.

* * * * *